(12) United States Patent
Cherolis et al.

(10) Patent No.: US 7,607,891 B2
(45) Date of Patent: Oct. 27, 2009

(54) TURBINE COMPONENT WITH TIP FLAGGED PEDESTAL COOLING

(75) Inventors: Anthony P. Cherolis, East Hartford, CT (US); Jesse R. Christophel, Manchester, CT (US); William Abdel-Messeh, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 464 days.

(21) Appl. No.: 11/585,054

(22) Filed: Oct. 23, 2006

(65) Prior Publication Data

US 2008/0095636 A1    Apr. 24, 2008

(51) Int. Cl.
    F01D 5/08    (2006.01)
    F01D 5/18    (2006.01)
(52) U.S. Cl. ........................... 416/97 R; 415/115
(58) Field of Classification Search ............... 415/115; 416/95, 96 R, 97 R
    See application file for complete search history.

(56) References Cited

U.S. PATENT DOCUMENTS

| | | | | |
|---|---|---|---|---|
| 4,278,400 A | * | 7/1981 | Yamarik et al. | 416/97 R |
| 4,474,532 A | * | 10/1984 | Pazder | 416/97 R |
| 4,767,268 A | * | 8/1988 | Auxier et al. | 416/97 R |
| 5,052,889 A | * | 10/1991 | Abdel-Messeh | 416/97 R |
| 5,403,159 A | * | 4/1995 | Green et al. | 416/97 R |
| 5,462,405 A | * | 10/1995 | Hoff et al. | 416/97 R |
| 5,857,837 A | * | 1/1999 | Zelesky et al. | 416/97 R |
| 5,931,638 A | * | 8/1999 | Krause et al. | 416/97 R |
| 5,975,851 A | * | 11/1999 | Liang | 416/97 R |
| 6,139,269 A | * | 10/2000 | Liang | 416/97 R |
| 6,257,831 B1 | * | 7/2001 | Papple et al. | 416/97 R |
| 7,014,424 B2 | * | 3/2006 | Cunha et al. | 416/97 R |
| 2005/0084370 A1 | * | 4/2005 | Gross | 416/95 |

* cited by examiner

*Primary Examiner*—Igor Kershteyn
(74) *Attorney, Agent, or Firm*—Carlson, Gaskey & Olds

(57) ABSTRACT

A turbine blade for a gas turbine engine is provided with improved cooling at a radially outer portion of the trailing edge. A tip flag path is provided with a first pedestal array to increase the heat transfer at the area. In addition, a second pedestal array replaces the metering holes which has been positioned radially inwardly of the tip strip. The two pedestal arrays provide improved heat transfer at an area which has been subject to burning and spallation in the prior art.

13 Claims, 3 Drawing Sheets

TURBINE COMPONENT WITH TIP FLAGGED PEDESTAL COOLING

BACKGROUND OF THE INVENTION

This application relates to a cooled turbine component, such as a turbine blade.

Gas turbine engines are known, and include a plurality of sections mounted along a serial flow path. A fan directs air into a compressor where it is compressed. The compressed air is delivered into a combustion section. In the combustion section the compressed air is mixed with fuel and combusted. Products of combustion pass downstream over turbine rotors. The turbine rotors are driven by the products of combustion, and drive the fan and compressor sections. Typically, the turbine includes a plurality of rotors each having circumferentially spaced blades that are removable from the rotor. In addition, stationary vanes are positioned adjacent to the turbine rotors.

The products of combustion are hot, and thus the rotor blades and vanes are exposed to high temperatures. One method to address the high temperatures experienced by the blades is the use of internal air cooling passages in the blade airfoil. The design of turbine blades includes optimizing air cooling passages. One standard type of passage is a serpentine path. In a serpentine path, cooling air is directed radially outwardly from an inner root of the blade and toward an outer tip of the blade. The air reaches the outer tip of the blade and circulates back toward the root, eventually returning again back radially outwardly. Another type of cooling air passage directs air along a length of the airfoil, and then direct the air outwardly to openings at a trailing edge. This type of cooling air passage is often utilized with a plurality of metering openings which meter the amount of air being delivered to trailing edge skin cooling openings.

In the prior art the cooling of the radially outermost portion of the airfoil at the trailing edge has proven problematic. As one example, the cooling air path delivering air to the trailing edge has delivered much of its air outwardly for skin cooling before reaching the radially outer portion of the trailing edge. As such, cooling is not as effective as it is at radially inner locations. Thus, in the prior art additional cooling has been delivered by a tip flag including a divider directing some air from a radially outer part of the serpentine path to the radially outer portion of the traveling edge. This air provides additional cooling to the area in question. However, additional cooling is still necessary. One further refinement of the tip flag concept is to provide trip strips on the walls of the blade along the tip flag path. These tip strips create turbulence in the airflow, and thus increase cooling. Even so, there are still problems with spallation of external coatings, burning, and oxidation at the area in question.

SUMMARY OF THE INVENTION

In the disclosed embodiment of this invention, additional cooling is provided at the radially outer trailing edge of a turbine component having an airfoil. In particular, a tip flag is utilized to direct cooling air to the radially outermost portion of the trailing edge. The tip flag is provided with a heat transfer pedestal array along a tip flag path, with the pedestals providing additional heat transfer surfaces to remove additional heat from the airfoil.

In another feature of this invention, the radially outermost portions of the areas of the airfoil which are cooled by the direct flow, and through the metering holes, are also improved. In particular, the last few metering holes are replaced by a pedestal array. Again, the pedestal array provides additional heat transfer surfaces which remove heat from the area in question.

These and other features of the present invention can be best understood from the following specification and drawings, the following of which is a brief description.

DETAILED DESCRIPTION OF THE PREFERRED EMBODIMENT

Figure 1:
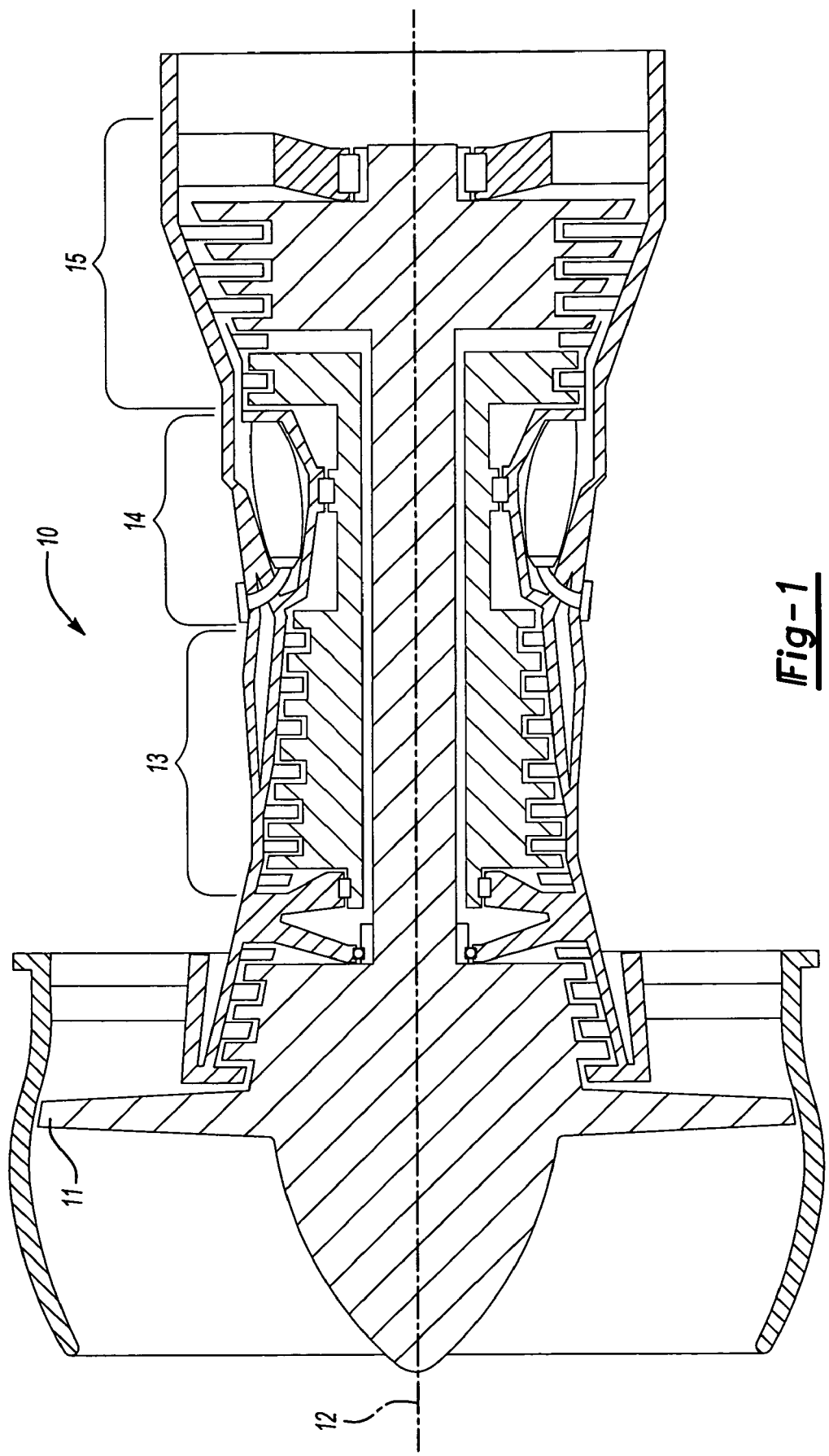
FIG. 1 is a schematic view of a gas turbine engine as known in the prior art.

FIG. 1 shows a gas turbine engine 10, such as a gas turbine used for propulsion, circumferentially disposed about an engine centerline, or axial centerline axis 12. The engine 10 includes a fan 11, a compressor section 13, a combustion section 14 and a turbine section 15. As is well known in the art, air compressed in the compressor section is mixed with fuel which is burned in the combustion section 40 and expanded in turbine section 15. The air compressed in the compressor section and the fuel mixture expanded in the turbine section 15 can both be referred to as a hot gas stream flow. The turbine section 15 includes rotors that, in response to the expansion, rotate, driving the compressors and fan. The turbine 15 comprises alternating rows of rotary blades 30 and static airfoils or vanes 19. FIG. 1 is a somewhat schematic representation, for illustrative purposes only, and is not a limitation of the instant invention, that may be employed on gas turbines used for power generation, aircraft propulsion, and for other applications.

Figure 2:
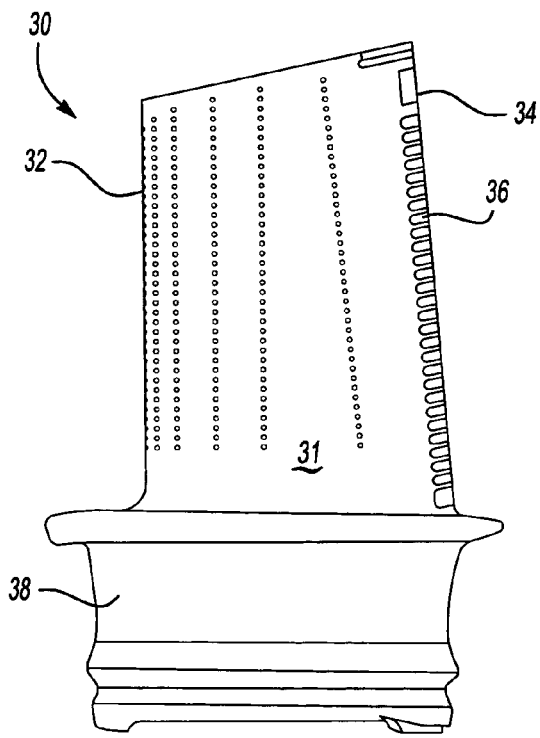
FIG. 2 shows a turbine blade also as known in the prior art.

FIG. 2 shows a turbine blade 30 having an airfoil 31 and a root 38. The root 38 serves to mount the turbine blade 30 in a turbine rotor. As known, the airfoil 31 extends from a leading edge 32 to a trailing edge 34. Skin cooling openings 36 are provided at the trailing edge and cooling air is directed outwardly through those openings to cooling the trailing edge.

Figure 3:
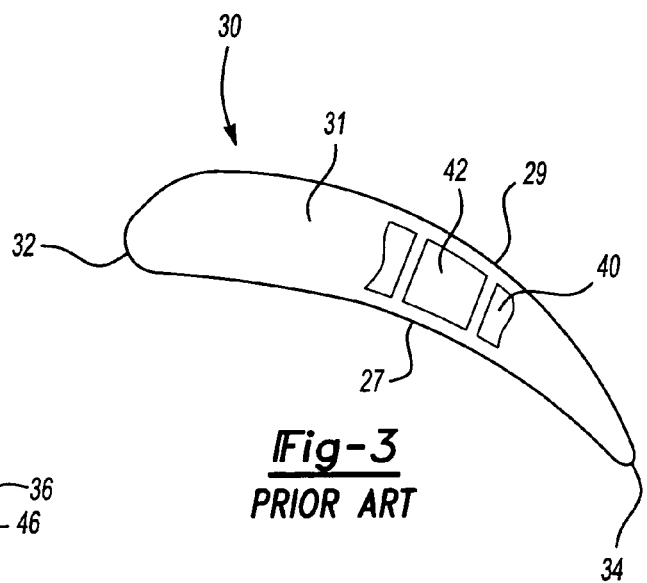
FIG. 3 is a top view of an airfoil which is part of the turbine blade in the prior art.

As shown in FIG. 3, the airfoil 31 has a curved shape, between a wall 29 and a wall 27. As is known, these walls define a generally hollow space, and internal cooling flow passages such as shown in 40 and 42 are formed within the hollow space. The hollow space is generally formed by a ceramic core during the lost wax investment casting process.

Figure 4:
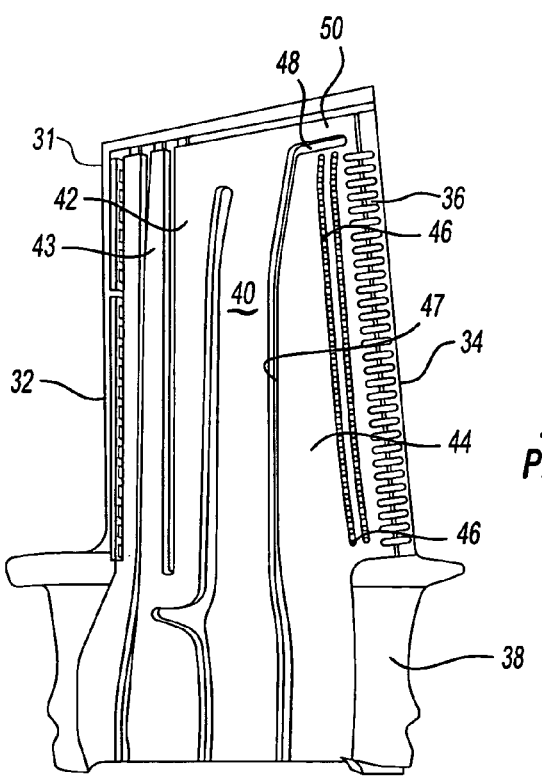
FIG. 4 shows internal cooling flow passages in a prior art turbine blade.

As shown in FIG. 4, a serpentine path is provided by passages 40, 42, 43. Air circulates from the root 38 radially outwardly through passage 40, returns radially inwardly through passage 42, and then returns radially outwardly through passage 43 and exits the airfoil 31. As shown near a radially outer tip of the airfoil, a tip flag rib 48 extends from a divider wall 47 which separates a direct passage 44 from the serpentine passage 40. The tip flag rib 48 directs a portion of the air from the passage 40 outwardly through the tip flag path 50 and to the trailing edge 34. This provides additional cooling at a radially outer portion of the trailing edge. As shown, radially inward of tip flag rib 48, the direct flow channel 44 directs air through a plurality of metering holes 46 to the skin cooling openings 36.

Figure 5:
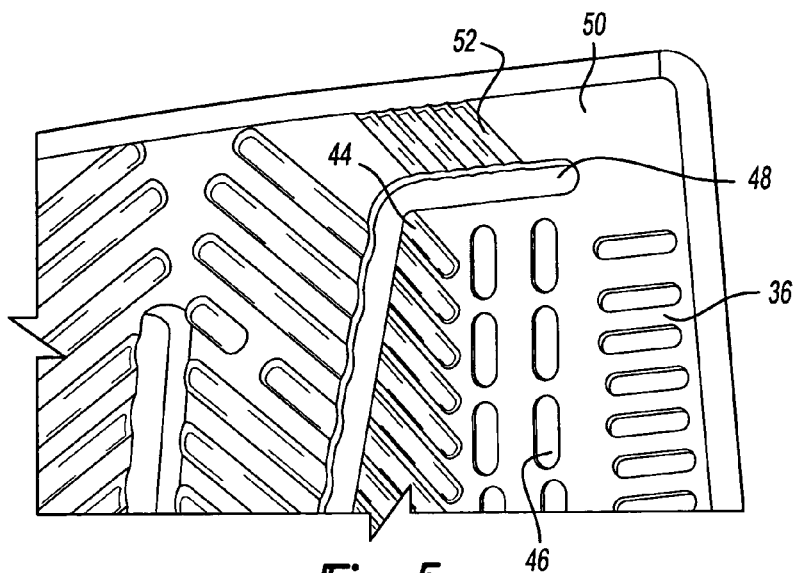
FIG. 5 shows further features of the internal cooling passages in the prior art turbine blade.

FIG. 5 shows further features of the tip flag, and the passages 46. As shown, the tip flag path 50 may be provided with trip strips 52. Trip strips 52 are formed on the inner surfaces of the walls 27 and 29, but do not extend across the space between the walls. The trip strips are designed to create turbulence in the cooling airflow, thus increasing the heat transfer. As mentioned above, with these prior art structures there is still inadequate cooling at the radially outer portion of the trailing edge. Trip strips also cannot be used as far toward the trailing edge as pedestals due to manufacturability issues associated with the thinness and fragility of the ceramic core. While the present invention and the prior art problem are discussed with regard to turbine blades, other airfoils or gas turbine components can benefit from this invention. In particular, the invention can extend to stationary vanes.

Figure 6A:
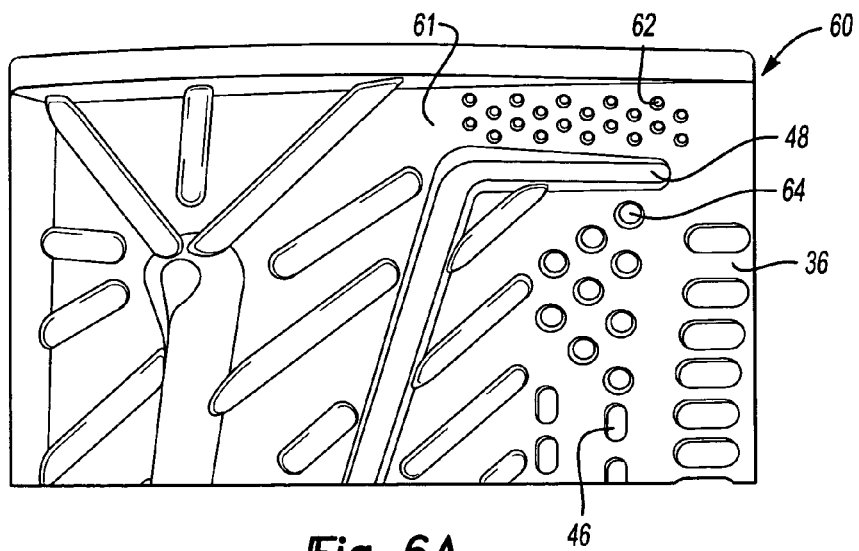
FIG. 6A shows cooling passages in another turbine blade.
Figure 6B:
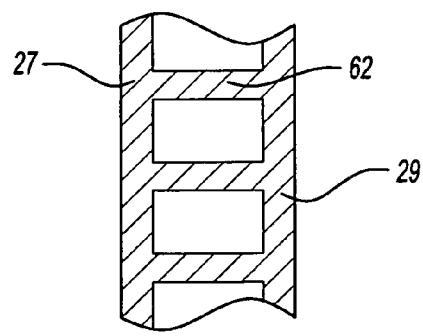
FIG. 6B shows pedestal array in a turbine blade.

FIG. 6A shows another turbine blade 60. The tip flag 48 still directs air into a tip flag path 61. However, a pedestal array 62 is provided in the path 61. As shown in FIG. 6B, the pedestals 62 extend entirely across the airfoil, and between the walls 27 and 29. The pedestals serve to deliver more heat into the cooling airflow, and thus better address the problem mentioned above. In addition, a second pedestal array 64 is formed to replace the last several metering holes 46 radially inward the tip flag 48. This pedestal array 64 also removes additional heat from the area and allows for a more robust and manufacturable ceramic core. As is clear from the FIGS., the second pedestal array 64 is positioned radially intermediate a radially outermost of the metering holes 46, and the tip flag. Also, there are skin cooling openings positioned spaced toward the trailing edge from both the metering holes 46 and the second pedestal array.

As can be appreciated from FIG. 6A, the pedestal array 64 may have pedestals of greater diameter than the pedestals 62.

The inclusion of the pedestals at the radially outer portion of the trailing edge significantly increases the heat transfer, and thus the cooling of the particular area. By including these pedestals, the prior art problem of burning and spallation can be addressed.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A component for a gas turbine engine comprising:

an airfoil extending from a radially inner portion to a radially outer portion and having spaced pressure walls with said airfoil being generally hollow between said walls, and said airfoil extending from a leading edge to a trailing edge; and internal cooling flow passages formed in said airfoil, there being a direct cooling passage directing cooling air from said radially inner portion toward said radially outer portion of said airfoil, said direct cooling passage directing cooling air through a plurality of metering openings to skin cooling openings near said trailing edge of said airfoil, and a serpentine cooling path positioned toward said leading edge from said direct cooling passage, said serpentine cooling path directing air radially outwardly toward said radially outer portion of said airfoil, then back radially inwardly, and eventually back radially outwardly, said direct cooling passage being separated from a portion of said serpentine cooling path by a divider wall, said divider wall having a tip flag at a radially outer location which extends toward said trailing edge, and which selectively communicates a portion of air in the serpentine cooling path toward said trailing edge along a tip flag path defined radially outwardly of said tip flag, and a first pedestal array extending between said walls in said tip flag path, and along said tip flag, to direct heat into cooling air flowing along said tip flag path.

2. The gas turbine component as set forth in claim 1, wherein pedestals in said first pedestal array extend from a location of said wall along said tip flag to a position adjacent to the trailing edge.

3. The gas turbine component as set forth in claim 1, wherein the metering openings for the direct cooling passage ending at a location radially inwardly of said tip flag, and a second pedestal array extending between said walls radially inwardly of said tip flag, such that cooling air in the direct cooling passage passes over said second pedestal array before leaving said skin cooling openings at said trailing edge.

4. The gas turbine component as set forth in claim 3, wherein pedestals in said second pedestal array have a diameter which is greater than a diameter of the pedestals in the first pedestal array.

5. The gas turbine component as set forth in claim 1, wherein the gas turbine component is a turbine blade.

6. A component for a gas turbine engine comprising:

an airfoil extending from a radially inner portion to a radially outer portion and having spaced walls with said airfoil being generally hollow between said walls, and said airfoil extending from a leading edge to a trailing edge; and internal cooling flow passages formed in said airfoil, there being a direct cooling passage directing cooling air from said radially inner portion toward said radially outer portion of said airfoil, said direct cooling passage directing cooling air through a plurality of metering openings to skin cooling openings near said trailing edge of said airfoil, and a serpentine cooling path positioned toward said leading edge from said direct cooling passage, said serpentine cooling path directing air radially outwardly toward said radially outer portion of said airfoil, then back radially inwardly, and eventually back radially outwardly, said direct cooling passage being separated from a portion of said serpentine cooling path by a divider wall, said divider wall having a tip flag at a radially outer location which extends toward said trailing edge, and which selectively communicates a portion of air in the serpentine cooling path toward said trailing edge along a tip flag path, the metering openings for the direct cooling passage ending at a location radially inwardly of said tip flag, and a pedestal array extending between said walls radially inwardly of said tip flag, said second pedestal array being positioned radially intermediate a radially outermost of said metering openings, and said tip flag, such that cooling air in the direct cooling passage passes over said pedestal array before leaving said skin cooling openings at said trailing edge.

7. The gas turbine component as set forth in claim 6, wherein the gas turbine component is a turbine blade.

8. The gas turbine component as set forth in claim 6, wherein there are skin cooling openings positioned spaced toward said trailing edge from both said metering openings and said second pedestal array.

9. A component for a gas turbine engine comprising:

an airfoil extending from a radially inner portion to a radially outer portion and having spaced walls with said airfoil being generally hollow between said walls, and said airfoil extending from a leading edge to a trailing edge; and internal cooling flow passages formed in said airfoil, there being a direct cooling passage directing cooling air from said radially inner portion toward said radially outer portion of said airfoil, said direct cooling passage directing cooling air through a plurality of metering openings to skin cooling openings near said trailing edge of said airfoil, and a serpentine cooling path positioned toward said leading edge from said direct cooling passage, said serpentine cooling path directing air radially outwardly toward said radially outer portion of said airfoil, then back radially inwardly, and eventually back radially outwardly, said direct cooling passage being separated from a portion of said serpentine cooling path by a divider wall, said divider wall having a tip flag at a radially outer location which extends toward said trailing edge, and which selectively communicates a portion of air in the serpentine cooling path toward said trailing edge along a tip flag path defined radially outwardly of said tip flag, and a first pedestal array extending between said walls in said tip flag path, and along said tip flag, to direct heat into cooling air flowing along said tip flag path, and the metering openings for the direct cooling passage ending at a location radially inwardly of said tip flag, and a second pedestal array extending between said walls radially inwardly of said tip flag, said second pedestal array being positioned radially intermediate a radially outermost of said metering openings, and said tip flag, such that cooling air in the direct cooling passage passes over said second pedestal array before leaving said skin cooling openings at said trailing edge.

10. The gas turbine component as set forth in claim 9, wherein pedestals in said first pedestal array extend from a location of said wall along said tip flag to a position adjacent to the trailing edge.

11. The gas turbine component as set forth in claim 9, wherein pedestals in said second pedestal array have a diameter which is greater than a diameter of the pedestals in the first pedestal array.

12. The gas turbine component as set forth in claim 9, wherein the gas turbine component is a turbine blade.

13. The gas turbine component as set forth in claim 9, wherein there are skin cooling openings positioned spaced toward said trailing edge from both said metering openings and said second pedestal array.

* * * * *